United States Patent [19]

Yamamoto et al.

[11] 4,387,313
[45] Jun. 7, 1983

[54] MOLDED SUBMERSIBLE MOTOR

[75] Inventors: Sakuei Yamamoto; Mitsuhiro Nishida; Noboru Tashiro; Nobuo Sonoda, all of Fukuoka, Japan

[73] Assignee: Mitsubishi Denki Kabushiki Kaisha, Tokyo, Japan

[21] Appl. No.: 370,634

[22] Filed: Apr. 21, 1982

[30] Foreign Application Priority Data

Apr. 22, 1981 [JP] Japan .................................. 56-58969
Apr. 22, 1981 [JP] Japan .................................. 56-58971
Apr. 22, 1981 [JP] Japan .................................. 56-58973

[51] Int. Cl.³ .......................................... H02B 11/00
[52] U.S. Cl. ...................................... 310/71; 310/87
[58] Field of Search ................. 310/43, 68, 71, 166; 339/153, 154

[56] References Cited

U.S. PATENT DOCUMENTS

| | | | |
|---|---|---|---|
| 3,387,253 | 6/1968 | Salners et al. | 339/154 R |
| 3,510,825 | 5/1970 | Quackenbush | 339/153 |
| 3,614,494 | 10/1971 | Borchers et al. | 310/166 |
| 3,631,275 | 12/1971 | Conrad et al. | 310/43 |
| 3,952,218 | 4/1976 | Deters | 310/71 |
| 3,997,232 | 12/1976 | Dunaway | 310/68 R |
| 4,017,136 | 4/1977 | Sasgen | 339/154 R |

Primary Examiner—Donovan F. Duggan
Assistant Examiner—Anita Ault
Attorney, Agent, or Firm—Sughrue, Mion, Zinn, Macpeak and Seas

[57] ABSTRACT

A molded submersible well motor comprises a hollow cylindrical frame 5 formed of resinous molding material into which a stator assembly having stator cores 2 and coils 3 is molded. End brackets 8 also formed of resinous molding material are detachably secured to opposite ends of the frame to close the openings thereof. A starting switch 12 for the motor is molded into the upper end bracket, together with an interconnecting terminal 9 comprising upper and lower contact posts 91, 92 for connecting the power cable 10 to the stator coils via a connector 6 and an intermediate connector 11, and a sub-receptacle 901, 930 projecting outwardly perpendicular to the main terminal 9 for connection to the starting switch.

6 Claims, 9 Drawing Figures

MOLDED SUBMERSIBLE MOTOR

BACKGROUND OF THE INVENTION

This invention relates to a molded submersible motor particularly suitable for use in a well, having an improved electrical connector arrangement for interconnecting the power cable leads, the stator coils and an encapsulated starting switch unit.

A conventional submersible motor of the "canned" type has thin cylindrical metal liners of stainless steel rigidly fitted to the inner and outer circumferences of the stator, with liquid for lubricating the motor bearings filling the inner metal liner surrounding the rotor. While the canned type motor provides excellent electrical insulation for the stator coil, it requires a number of additional components such as flanges for securing end brackets or caps and for sealing the openings between both metal liners fixed to the stator. The brackets must be machined to close tolerances to enable watertight joints with the metal liners, which results in increased machining steps and manufacturing cost.

There has also been provided a molded type motor as disclosed in U.S. Pat. No. 4,015,154 to ostensibly eliminate the above-mentioned disadvantages of the canned motor. Such a molded motor gives rise to other problems, however, in that since the starting switch is embedded in the molded structure of the motor frame it is very difficult to replace or repair the starting switch unit, which is subject to frequent on-off operations and thus liable to become defective.

To overcome these problems a molded motor as shown in FIGS. 1 and 2 has been proposed which comprises a hollow cylindrical frame 5 formed of resinous molding material into which a stator structure having stator cores 2 and coils 3 is molded. End brackets 8 also formed of resinous molding material are detachably secured to the frame to close the end openings thereof. A starting switch 12 for the motor is molded into one of the end brackets, and may easily be removed and replaced if it fails. There are still some drawbacks with such a construction, however, in that it is necessary to provide additional connectors 15, 16 and 17, other than the main connector 6, for coupling the starting switch 12 housed in the end bracket to the stator coils 3. In addition, the frame 5 and end bracket 8 must be precisely molded to close tolerances and the connectors accurately positioned therein to enable the correct assembly of the bracket to the frame.

SUMMARY OF THE INVENTION

To overcome these problems the present invention provides a molded motor which comprises a hollow cylindrical frame formed of resinous material into which a stator structure having stator cores and coils is molded. End brackets also formed of resinous molding material are detachably secured to the frame to close the end openings thereof. A starting switch for the motor is molded into one of the end brackets, and an interconnecting terminal comprising first and second contact posts for connecting the power cable to the stator coils and a sub-receptacle for connecting the starting switch is also molded into the end bracket. The interconnecting terminal provides ease of installing the connectors in the proper relative position when assembling the motor and ease of connection between the starting switch and the power cable.

DETAILED DESCRIPTION OF THE PREFERRED EMBODIMENTS

Figure 1:
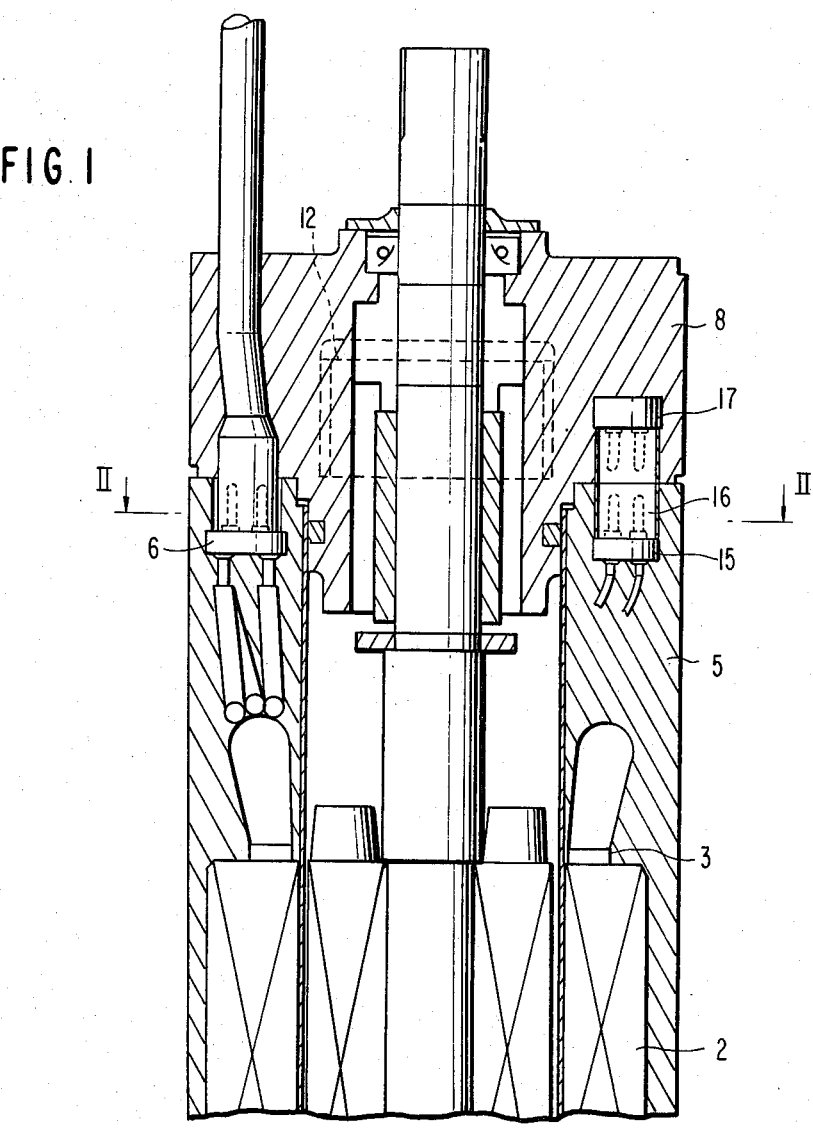
FIG. 1 is a partial longitudinal sectional view of a conventional molded motor.
Figure 2:
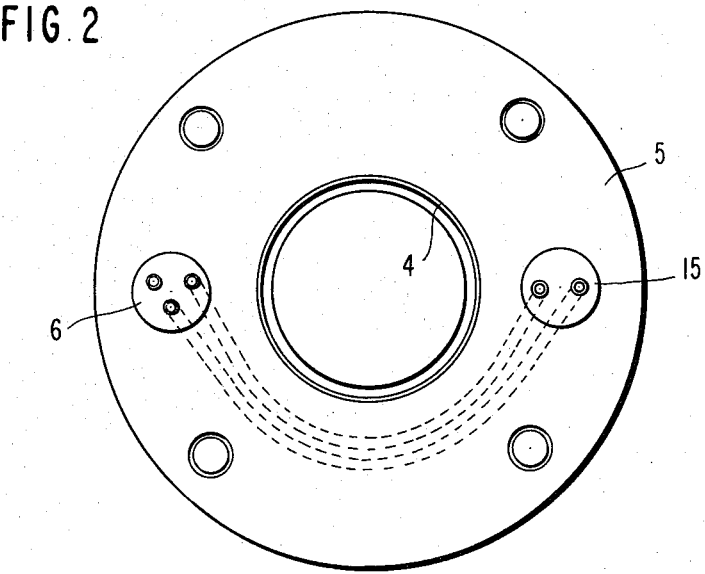
FIG. 2 is a transverse sectional view taken along line II—II of FIG. 1.
Figure 3:
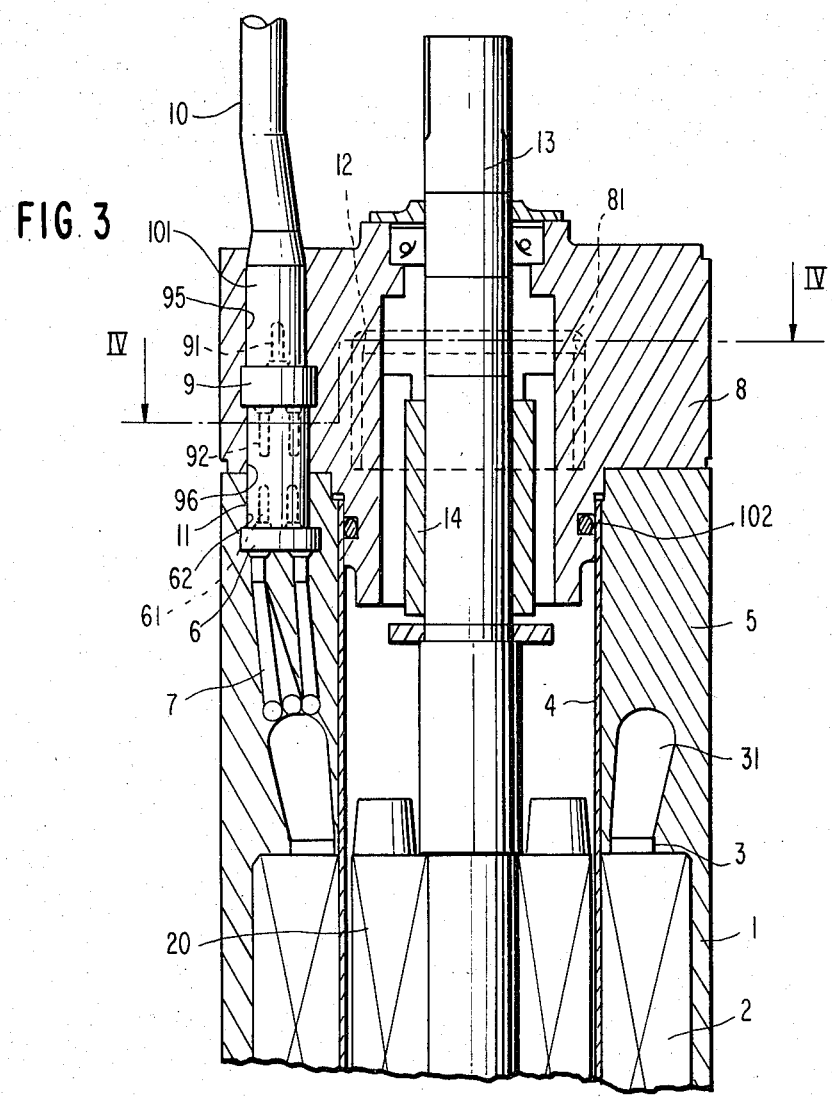
FIG. 3 is a partial longitudinal sectional view of a molded motor according to the invention.

In FIGS. 3 through 8, which show examples of a molded motor according to the present invention, a stator 1 comprises a stator core 2 and a stator coil 3 (shown in FIG. 3). A cylindrical metal liner 4 of stainless steel is fixedly inserted into the inner circumference of the stator 1 to seal the inner bore of the stator structure and thereby protect the stator coil 3 from contact or contamination by the rotor area liquid, such as water containing propylene glycol antifreeze. The outer circumference and end portions of the stator core 2 and coil ends 31 are molded within a frame 5 formed of resinous molding material, such as polyester or vinyl resin.

A connector 6, part of which is molded into the frame 5, is coupled to stator lead wires 7. Receiving bolt 310 (FIG. 8) fastens end caps or brackets 8 to the frame 5, and at the same time attaches a driven apparatus such as a pump 300. An upper connector 101 coupled to a power source cable 10 and a motor starting assist switch 12 are molded into a cavity 81 of the bracket 8 at the end whereat a pump or the like driven by the motor would be attached.

Figure 5A:
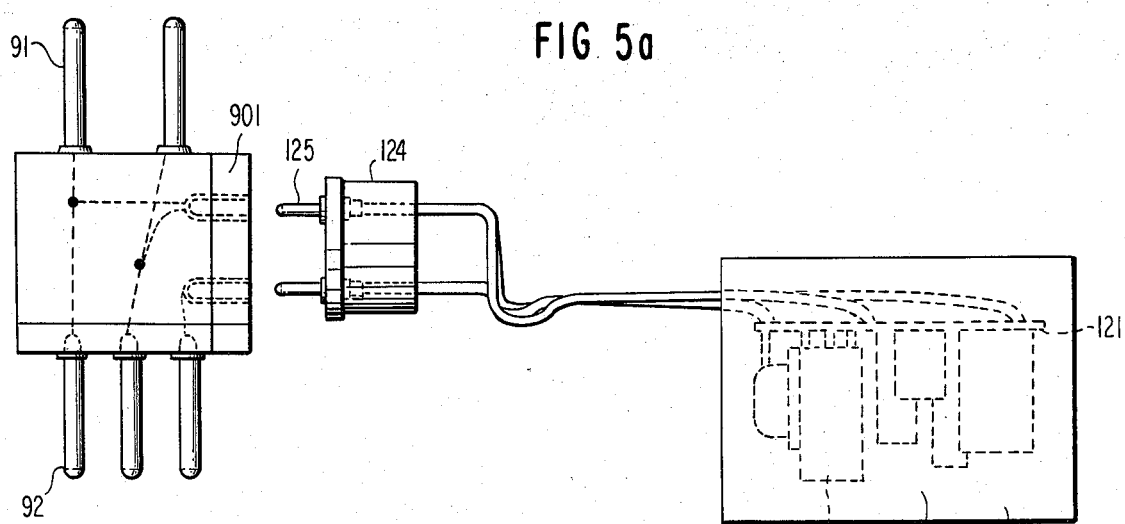
FIG. 5a is an external elevation view of a starting switch and an interconnecting terminal shown in FIG. 3.

The starting switch 12 is, as shown in FIG. 5a, composed of an electronic component 122 assembled on a base board 121 and sealed within a resinous protecting covering 123, and is connected to a jack plug 124 having jack posts 125.

The switch 12 is an electronic switch which closes when the motor stops and opens after the motor has reached a predetermined speed to disconnect an auxiliary coil from a main coil (not shown) to which the auxiliary coil is connected in parallel.

A rotor shaft 13 is rotatably supported in bearing 14 located at the ends of the inner cylindrical metal liner 4. The lubrication of the bearing is accomplished by the liquid sealed within the chamber of the rotor assembly 20 by the metal liner 4 and O-rings or the like 102 provided between the bracket 8 and the frame 5.

Figure 8:
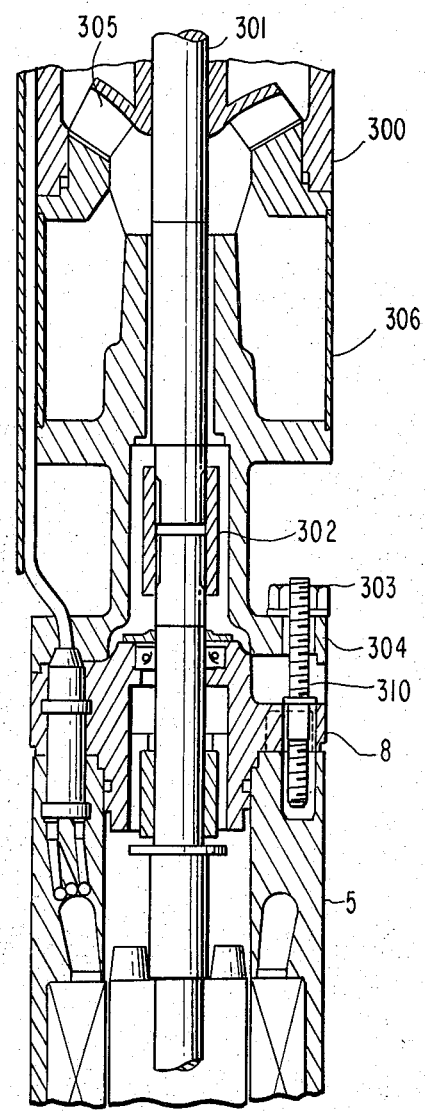
FIG. 8 is a partial longitudinal sectional view of a pump attached to the molded motor of the invention.

The pump 300 driven by the motor is attached to the upper end of the motor as shown in FIG. 8. An axle 301 of the pump is fastened to the rotor shaft by a coupling member 302. The pump 300 is fixed to the motor by a coupling bracket 304 secured to the bracket 8 by bolts 310 and nuts 303. The revolution of the rotor shaft is transmitted to the pump axle through the coupling 302 to drive a radial impeller 305 which discharges water filtered through a strainer 306.

Figure 4:
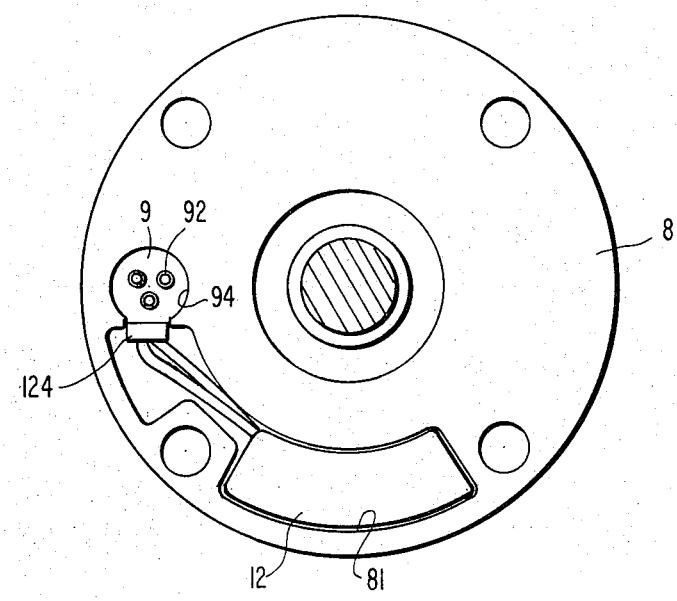
FIG. 4 is a transverse sectional view taken along line IV—IV of FIG. 3.
Figure 5B:
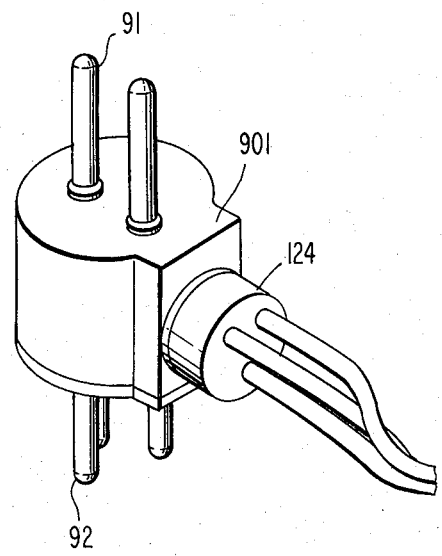
FIG. 5b is a perspective view of the interconnecting terminal shown in FIG. 5a, FIG. 6 is a transverse sectional view similar to FIG. 4 showing another embodiment of the invention.

An interconnecting terminal 9 of the jack plug type as shown in FIGS. 4, 5a and 5b is formed of unsaturated polyester resin or epoxy resin and is integrally molded into the end bracket 8. It has contact posts 91 and 92 at its upper and lower ends, respectively, and a sub-receptacle 901 disposed at a right angle to the main axis of the terminal 9.

A connecting unit 101 having an elastic covering for the power cable 10 is sealingly inserted into an aperture 95 in the bracket 8 for the watertight installation of the interconnecting terminal 9, and is connected to the upper contact posts 91. When assembling the motor, an intermediate connector 11 having an elastic covering and adapted to be connected to the lower contact posts 92 and to the posts 61 of connector 6 is forcedly inserted into apertures 96 in the bracket 8 and 62 in the frame 5 to seal the interconnecting terminal 9 and connector 6 in a watertight manner. The starting switch 12 is connected with the terminal 9 by inserting the posts 125 of plug 124 into the sub-receptacle 901.

Figure 6:
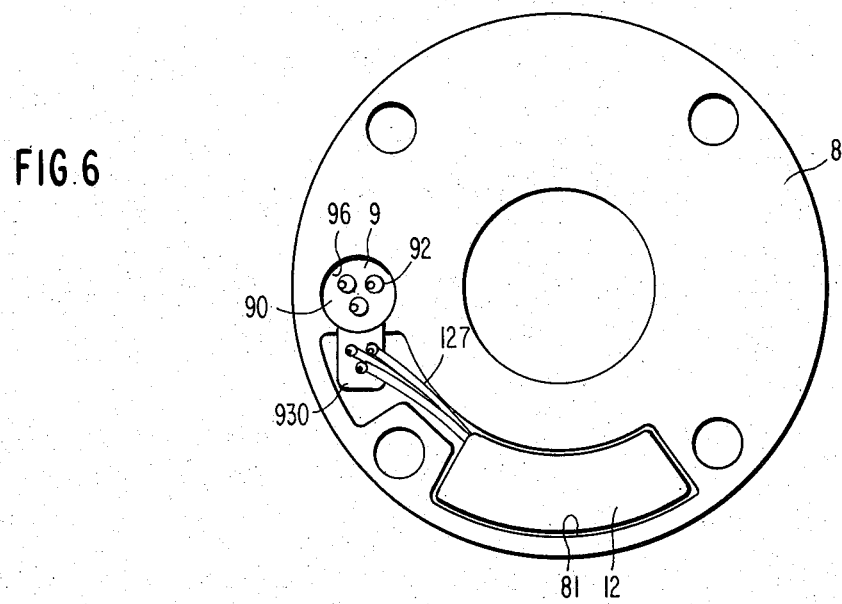
Figure 7:
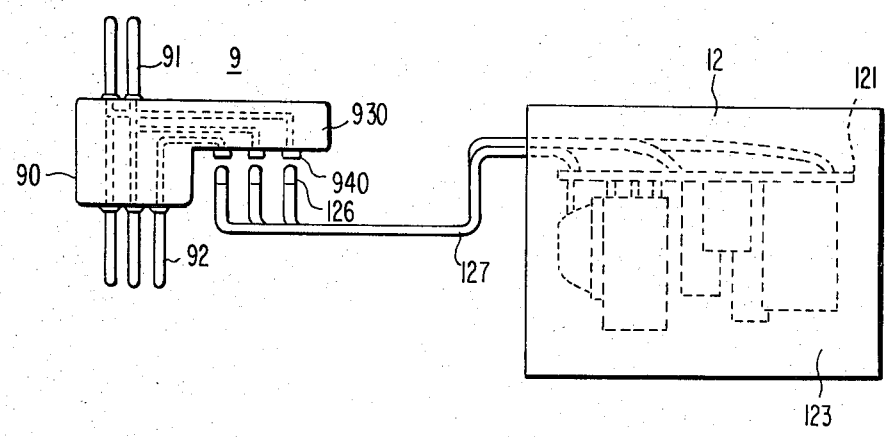
FIG. 7 is an external elevation view similar to FIG. 5 showing another embodiment of the starting switch and interconnecting terminal.

FIGS. 6 and 7 show another embodiment of the invention, wherein the interconnecting terminal 9 is provided with a sub-receptacle 930 again disposed at a right angle to the main terminal axis and having jack post receptacles 940 on its underside. The starting switch 12 is connected with terminal 9 by individually inserting pins 126 attached to lead wires 127 into the receptacles 940.

What is claimed is:

1. A molded submersible motor, comprising:
   (a) an open ended, hollow cylindrical frame (5) formed of resinous molding material,
   (b) a stator assembly including stator cores (2) and stator coils (3) embedded in said frame,
   (c) a rotor assembly (20) rotatably mounted inside of the stator assembly,
   (d) an end bracket (8) formed of resinous molding material and detachably secured to an upper end of said frame to close the opening thereof,
   (e) a starting switch unit (12) of said motor embedded in said end bracket,
   (f) a connector (6) molded into an axial end of said frame having contact means (61) connected to the stator coils,
   (g) an interconnecting terminal (9) embedded in said end bracket and comprising first contact means (91) for connection to a power cable (10) for said motor, second contact means (92) for connection to said stator coil connector, and third contact means (125, 126) connected to said starting switch,
   (h) an intermediate connector (11) disposed in aligned axial apertures (62, 96) formed in said frame and end bracket and extending from a lower portion of said end bracket to an upper portion of said frame, said intermediate connector connecting said second contact means of said interconnecting terminal to said contact means of said connector, and
   (i) a connecting unit (101) disposed in an axial aperture (95) formed in said end bracket for connecting said first contact means of said interconnecting terminal to said power cable,
   (j) said starting switch unit being embedded in said end bracket in a position laterally displaced from an axial alignment of said connecting unit, said interconnecting terminal, said intermediate connector and said connector.

2. A molded submersible motor according to claim 1, wherein said interconnecting terminal comprises a main body portion having pairs of first and second contact means protruding axially from opposite ends thereof for connection to said power cable and to said stator coil connector, respectively, and a sub-receptacle connected to said third contact means extending at substantially a right angle to the axis of said main body portion.

3. A molded submersible motor according to claim 2, wherein said sub-receptacle protrudes outwardly from said main body portion.

4. A molded submersible motor according to claim 3, wherein said sub-receptacle and third contact means are connected at a right angle to said main body portion axis.

5. A molded submersible motor according to claim 3, wherein said sub-receptacle and third contact means are connected parallel to said main body portion axis.

6. A molded motor according to claim 1, wherein a liquid for lubricating bearings (14) of a shaft (13) of said rotor assembly is sealed within said motor, and a thin cylindrical metal liner (4) for sealing an inner bore of the stator assembly to protect and isolate the stator coils from said liquid is affixed to an interior periphery of the stator assembly.

* * * * *